United States Patent [19]

Mitchell et al.

[11] 4,137,752
[45] Feb. 6, 1979

[54] LEAK-TESTING METHOD FOR DIAPHRAGM-TYPE ELECTROLYTIC CELLS

[75] Inventors: William D. Mitchell, Cleveland; John O. Adams, Englewood; John J. Simmons, Cleveland, all of Tenn.

[73] Assignee: Olin Corporation, New Haven, Conn.

[21] Appl. No.: 826,505

[22] Filed: Aug. 22, 1977

[51] Int. Cl.² ............................................. G01M 3/06
[52] U.S. Cl. ............................................................ 73/45.5
[58] Field of Search ...................... 73/40, 40.5 R, 41.2, 73/41.3, 41.4, 45.5–45.8

[56] References Cited

U.S. PATENT DOCUMENTS

| | | | |
|---|---|---|---|
| 1,370,437 | 3/1921 | Gustafson | 73/45.5 |
| 3,166,439 | 1/1965 | Dennhofer | 73/45.5 X |
| 4,002,055 | 1/1977 | Kops | 73/40 |
| 4,016,749 | 4/1977 | Wachter | 73/45.5 |
| 4,034,598 | 7/1977 | Ames et al. | 73/40 |
| 4,048,845 | 9/1977 | Gilbert | 73/45.5 |

*Primary Examiner*—John Petrakes
*Attorney, Agent, or Firm*—Bruce E. Burdick; Donald F. Clements; Thomas P. O'Day

[57] ABSTRACT

A method for leak-testing synthetic separators for interleaved planar electrodes is described. The method includes installing the separator such as a diaphragm or membrane about the electrodes to create an enclosed chamber within the separator, supporting the electrodes from a supportive cell housing, pressurizing the created chamber to a predetermined pressure with a gas, slowly filling the housing with a liquid to a level above the separator and observing the separator during the filling operation to determine if leaks are present in the separator.

15 Claims, 6 Drawing Figures

LEAK-TESTING METHOD FOR DIAPHRAGM-TYPE ELECTROLYTIC CELLS

This invention relates to electrolytic cells and specifically to testing of diaphragms and membranes for such cells.

Chlorine and caustic soda are predominantly produced by the use of electrolytic cells of two types. One type is called a mercury cell and employs a flowing mercury liquid cathode in a trough-like housing and produces a relatively high purity caustic product. However, there has been increasing concern over the fact that mercury is being utilized in such cells because of the environmental effects of mercury contamination. A second type of "chlor-alkali" electrolytic cell is the "diaphragm-type" which may be of two varieties. The first variety is the conventional porous diaphragm which produces a somewhat lower purity caustic than the mercury cell and which also suffers from attack by environmentalists due to its use of asbestos fibers in the diaphragm. The second variety of "diaphragm-type" cells is the "membrane" cell which utilizes a nonporous, ion permeable separator which serves to greatly limit the movement of chlorine ions from anolyte to catholyte while allowing cation exchange to proceed relatively uninhibited, thus producing a high purity caustic product more closely approximating the purity of the caustic product with mercury cells. In order for such membranes to operate efficiently, it is desirable that they be "leak-free" so that there is no flow of anolyte solution through the membrane to contaminate the catholyte and caustic product.

Therefore, it is necessary that the membrane be tested in some manner for such leaks. The conventional method of such testing is to simply put the membrane into the membrane cell and operate the cell while checking to see if the catholyte becomes unduly contaminated with chlorine. However, such a method provides no "prevention", but rather merely allows one to realize when damage is occuring because of a leak. A second method of leak-testing in current use is to check the membrane material prior to assembly of the membrane structure to be used in the cell itself. Such a method is inherently unreliable because the fabrication of the membrane structure may result in leaks which were not present prior to such fabrication. Therefore, there is a need for a better method of testing membranes prior to actual use in a production cell, and a further need to make such method relatively simple and foolproof.

A solution to these and other problems is given by the present invention which provides a method for leak-testing synthetic separators for interleaved planar electrodes, which comprises the steps of:

(a) attaching a supportive cell housing to said electrodes;

(b) installing said synthetic separator sealingly about said electrode so as to create an enclosed chamber within said separator;

(c) pressurizing said chamber to a predetermined pressure with a gas;

(d) slowly filling said housing with a liquid to a level above said separator so as to slowly immerse said separator in said liquid; and (e) observing said separator while maintaining said predetermined pressure within said chamber so as to determine if excessive amounts of said gas indicative of a leak are escaping through any portion of said immersed separator.

Another aspect of the invention provides a method for leak-testing synthetic separators for interleaved planar electrodes of an electrolytic cell, which comprises the steps of:

(a) attaching a supportive cell housing to said electrodes;

(b) installing said synthetic separator sealingly about said electrodes so as to create an enclosed chamber within said separator;

(c) pressurizing said chamber to a predetermined pressure, said predetermined pressure being a gauge pressure which, when expressed in height of water, is at least one inch but no more than about half of the height of said separator, thereby only indicating leaks in that portion of the separator that is immersed in water to a depth in inches not greater than said height in inches of said predetermined pressure and thereby preventing indication in that portion of said separator therebelow;

(d) slowly filling said housing with a liquid to a level above said separator so as to slowly immerse said separator in said liquid; and (e) observing said separator while maintaining said predetermined pressure within said chamber so as to determine if excessive amounts of said gas indicative of a leak are escaping through any portion of said immersed separator.

The invention will be better understood by reference to the attached drawings, in which.

Figure 1:
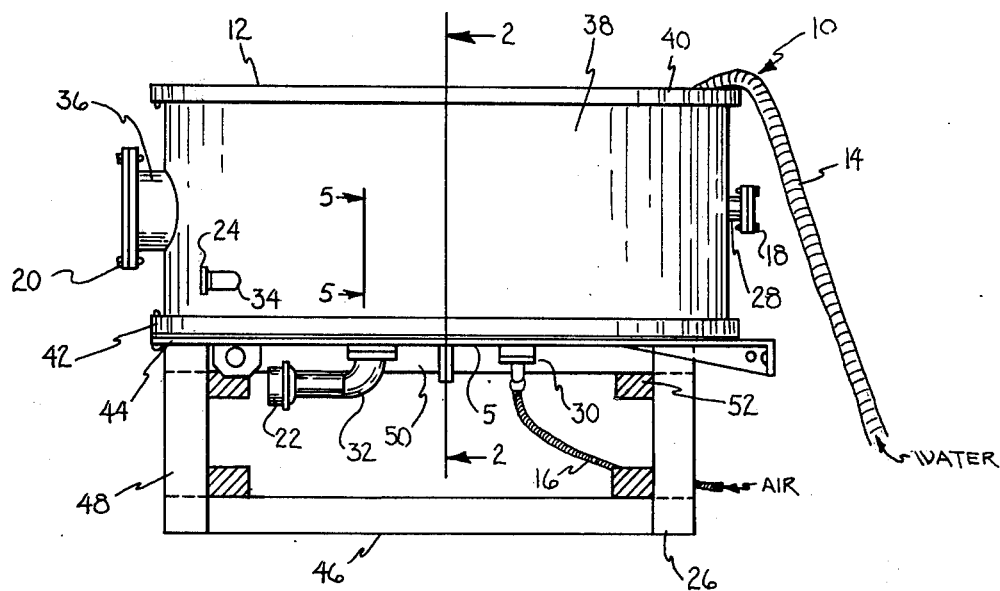
FIG. 1 is a front elevational view of a cell housing with appropriate attachments for performing the method of the invention.

FIG. 1 is a front view showing the preferred leak-testing apparatus 10 for use in the method of the invention. Leak-testing apparatus 10 comprises cell housing 12, liquid supply conduit 14, air supply conduit 16, plugs 18, 20, 22 and 24 and a support framework 26. Cell housing 12 is a tubular metallic body, which can be of the type disclosed in U.S. patent application Ser. No. 756,313 filed Jan. 3, 1977 by Kenneth E. Woodard, Jr. and Steven J. Specht commonly assigned, hereby incorporated by reference as if set forth at length herein, such a cell housing 12 includes a plurality of liquid and gas inlets and outlets 28, 30, 32, 34 and 36 for providing supply and removal of raw materials and products from cell housing 12 during normal operation thereof to produce chlorine and caustic products. Cell housing 12 also includes a tubular metallic body portion 38, an upper flange 40, a lower flange 42 and an anode backplate 44. The particular shape of the cell housing can be varied as desired within the scope of the invention, as the precise shape is not essential to the invention except insofar as a tank-like housing is necessary to contain the liquid utilized in the leak-testing procedure as described below. Cell housing 12 would normally include a cathode backplate (not shown) in addition to the anode backplate 44, however, the cathode backplate is not shown in FIG. 1 because it would be removed for the leak-testing procedure in order to simplify filling of the cell housing 12 with liquid. Cell housing 12 is shown with anode backplate 44 resting on framework 26. This orientation is sideways to the normal orientation of cell housing 12 during electrolytic operation of the cell. The cell housing 12 is placed on its side in order to allow an open upper end for observation of the membrane, described below, during leak-testing. It is necessary for such observation that the upper backplate be removed. In this case, that is the cathode backplate, but the cell housing 12 could be similarly supported by the cathode backplate and have the anode backplate removed in the case of a membrane enclosed cathode cell.

Framework 26 can be of any suitable design such as a construction comprising foot members 46, upright members 48, cross bar members 50 and beam members 52. Framework 26 also serves to protect anode outlets and inlets from damage due to the weight of cell housing 12 were it allowed to rest upon the anode inlets and outlets.

As shown in FIG. 1, cell housing 12 includes a caustic outlet 28, a combination brine and chlorine outlet 32, a catholyte liquid inlet 34 and a hydrogen outlet 36 which are plugged by plugs 18, 22, 24 and 20, respectively. Cell housing 12 also includes a brine inlet 30 which is connected to air supply conduit 16 for purposes below described. Air supply conduit 16 could also be connected to combination brine and chlorine outlet 32 if so desired, as the purpose of air supply conduit 16 is to supply pressurized air to the interior of a membrane as below described. However, it would be preferable to connect air supply conduit 16 to only one of inlet 30 and outlet 32 in order that the other inlet or outlet be utilized for draining any liquids which might enter the membrane.

Figure 2:
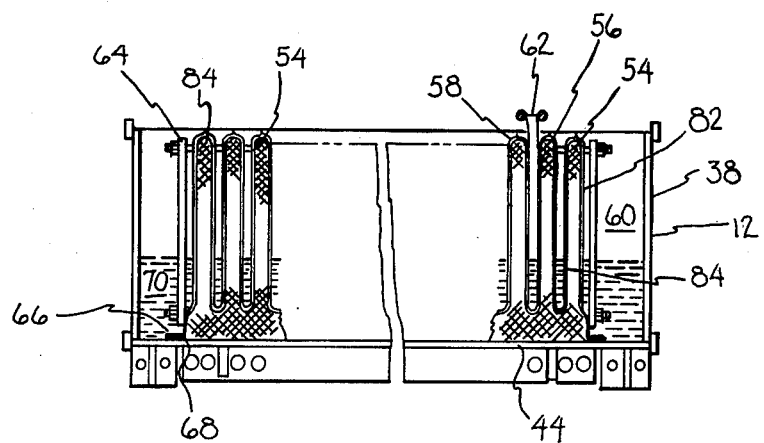
FIG. 2 is a side cross-sectional elevational view taken along lines 2—2 of FIG. 1, showing a separator being leak-tested.

FIG. 2 is a side cross-sectional view, taken along lines 2—2 of FIG. 1, showing the interior of the leak-testing apparatus 10 of FIG. 1. The interior of cell housing 12 is seen to surround a plurality of planar vertically oriented electrodes 54, which in this particular embodiment are foraminous metal anodes. Electrodes 54 are in turn enclosed by a synthetic separator or membrane 56 which is seen to be a glove-like structure comprising multiple finger-like substantially planar individual sections 58 which are interconnected to form a continuous layer which serves as synthetic separator or membrane 56. Membrane 56 is preferably gas-tight so that pressurized gas can be supplied to the interior, or lower side as shown in FIG. 2, during leak-testing without excessive leakage of gas through membrane 56 during such leak-testing. Cell body 28 and anode backplate 44 are seen to define a tank chamber 60 surrounding and outside of membrane 56. Tank chamber 60 serves to contain liquid during the leak-testing procedures as described below. Also seen in FIG. 2 is a spacer device 62 which serves to separate sections 58 in order to prevent an adjacent section 58 from restricting gas passage from a leaking section 58. FIG. 2 also shows a restraint device 64 which serves to prevent electrodes 54 from bowing or bending outwardly in response to gas pressure within membrane 56. Membrane 56 is sealingly attached to backplate 44 by a suitable clamp 66 which overlaps and holds an outer tab portion 68 of membrane 56. Clamp 66 can be attached to backplate 44 by bolts, screws, welds or other suitable connection means. Cell housing 12 is shown in FIG. 2 partially filled with a liquid 70 during a leak-test.

Figure 3:
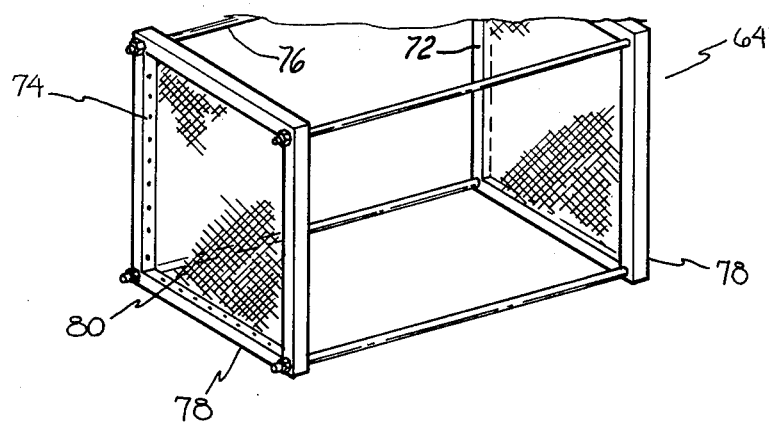
FIG. 3 is a perspective view of an electrode restraint device which can be used in the method of the invention.

FIG. 3 is a perspective view of restraint 64 of FIG. 2. Restraint 64 comprises two spaced panels 72 and 74 and connecting bolts 76. Panels 72 and 74 comprise an outer frame 78 and a planar mesh surface 80 adapted to lie adjacent to the outermost electrodes 82 and 84 as seen in FIG. 2 in order to prevent electrodes 54 from bowing or bending outwardly in response to pressurization of membrane 56 during leak-testing. Connecting bolts 76 serve to space and tighten panels 72 and 74 about electrodes 54 for that purpose.

Figure 4:
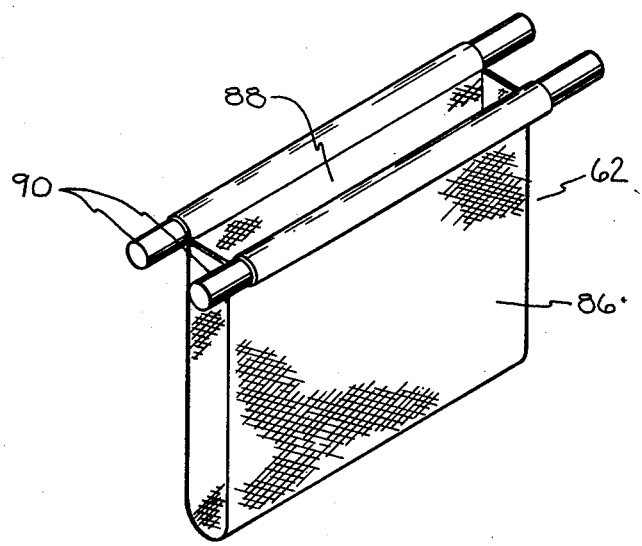
FIG. 4 is a perspective view of a spacing device which can be utilized in the invention.

FIG. 4 is a perspective view of the spacer device 62 of FIG. 2. Spacer device 62 is seen to comprise a porous hollow planar mesh surface 86 of sufficient rigidity surrounding and defining an observation chamber 88 located therewithin. Mesh surface 86 is connected to a pair of support rods 90 which can be of a length sufficient to lie across and be supported by the upper connecting bolts of restraint 64 during leak-testing. Spacer device 62 can also be a hollow individual anode or other hollow structure of planar configuration suitable size and rigidity to fit between electrodes 54 in order to provide an observation chamber for observing sections 58 of membrane 56.

Figure 5:
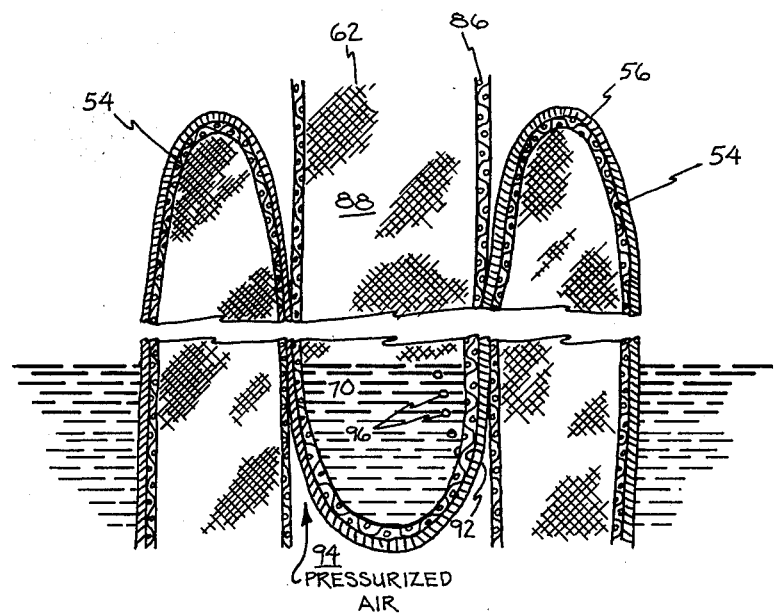
FIG. 5 is a partial side cross-sectional view of a separator undergoing leak-testing using the invention, the separator being shown without heat seals.

FIG. 5 is a side cross-sectional exploded view of two electrodes 54 and a single spacer device 62 separated by a membrane 56 during leak-testing. A "leak" 92 or faulty portion of membrane 56 is seen allowing escape of pressurized air or other gas from the region 92 within membrane 56 outwardly to observation chamber 88 through liquid 70 to produce bubbles 96 indicative of the presence of leak 92.

Figure 6:
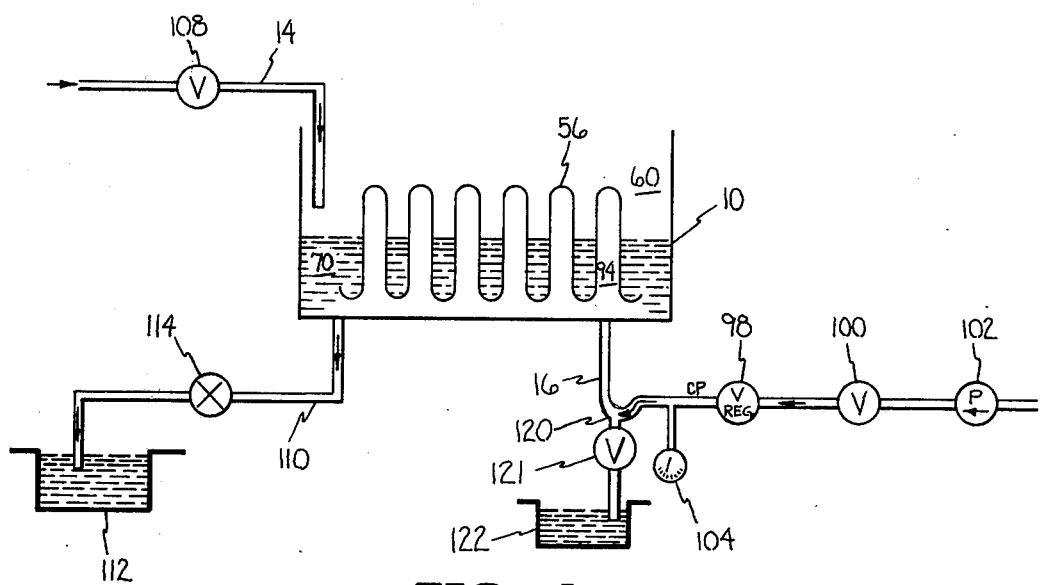
FIG. 6 is a schematic diagram of a leak-testing apparatus showing the means for supplying liquid and gas thereto.

FIG. 6 is a schematic diagram of a leak-testing apparatus showing the means for supplying liquid and gas thereto. Air supply conduit 16 is connected to a supply of gas through a constant pressure output regulating valve 98, a shut-off valve 100 and a pressurization means such as a compressor 102. A gauge 104 can be connected to air supply conduit 16 in order to give an indication of the pressure being supplied through air supply conduit 16 to the enclosed chamber or interior region 94 within membrane 56. Valves 98 and 100 and compressor 102 can be of any conventional design suitable for supplying pressurized gas at a pressure of from about one inch of water to about 28 inches of water when such pressure is expressed in height of water equivalent to such pressure. A liquid such as water is supplied to apparatus 10 from any suitable source through a liquid supply conduit 14. A throttle valve 108 can be provided in conduit 14 to regulate the rate of supply of liquid 70 to apparatus 10. Apparatus 10 can also be connected to a liquid drain conduit 110 leading to a reservoir 112. A liquid drain conduit 110 can be provided with a shut-off valve 114 to control flow therethrough.

The operation of leak-testing apparatus 10 during a leak test will now be described. Cell housing 12 is assembled without a cathode backplate and placed on its side atop support framework 26. Anode backplate 44 and cell body 38 serve to define a "tank" to which liquid can be fed from liquid supply conduit 14. Membrane 56 is sealingly attached to anode backplate 44 or otherwise sealingly positioned about electrodes 54 in order to define enclosed chamber or interior region 94. Alternatively, a plurality of individual regions could be created by use of multiple membranes each surrounding a separate one of electrodes 54. In such a configuration, a separate inlet 30 and outlet 32 would be necessary for each such region. Plugs 18, 20, 22 and 24 are then attached to inlets and outlets 28, 32, 34 and 36 while inlet 30 is left unplugged. Inlet 30 is then connected to air supply conduit 16 and liquid supply conduit 14 is placed within tank chamber 60 by simply leading supply conduit 14 over an upper edge of housing 12 and downwardly into tank chamber 60 through the opening left by the absence of a cathode backplate. It will be understood that a corresponding leak-testing apparatus utilizing membrane enclosed cathodes could be provided by removing the anode backplate of such apparatus and inverting the position of the corresponding cell housing of such a leak-testing apparatus.

With apparatus 10 thus connected to both air and liquid supply conduit, pressurized air or other gas is supplied to interior region 94 by opening valves 98 and 100. Valve 98 would be set at any desired output pressure within the range of about one inch to about 28 inches of water in order to pressurize interior region 94 to such pressure. With interior region 94 now pressurized, valve 108 is opened to slowly supply liquid 70 through liquid supply conduit 14 to tank chamber 60 while the surface of membrane 56 is observed for leaks in the manner described below.

Prior to pressurizing interior region 94, it is desirable to restrain electrodes 54 and membrane 56 from bowing outwardly. This is done by use of restraint 64 which is placed with panels 72 and 74 on the outer sides of the outermost electrodes 82 and 84 in order to prevent electrodes 82 and 84 from moving outwardly during leak-testing. Connecting bolts 76 of restraint 64 are tightened to provide a snug fit of restraint 64 against electrodes 82 and 84. As noted above, panels 72 and 74 include mesh surfaces 80 to allow observation of the portion of membrane 56 which lies on the outer surface of outermost electrodes 82 and 84.

In order to properly observe the finger sections 58 of membrane 56, spacer device 62 is inserted between each pair of adjacent finger sections, either sequentially or simultaneously, thus spacing finger sections 58 and allowing observation thereof through observation chamber 88. Valve 108 can be intermittently opened and closed in order to allow use of a single spacer device 62 to sequentially observe each pair of adjacent finger sections 58. This would be done by filling tank chamber 60 to a suitable level, then closing valve 108 in order to maintain liquid 70 at a given constant level while spacer device 62 is sequentially passed between each pair of finger sections 58 to test for leaks in membrane 56. After such sequential passage of spacer device 62, valve 108 is reopened for a limited time to raise the level of liquid 70 within tank chamber 60 to a new level. The spacer device 62 may then be placed again between each pair of finger sections 58 as noted above. This process can be repeated as often as desired.

If desired, a multi-fingered spacer device (not shown) comprising a plurality of interconnected spacer devices 62 can be utilized in order to simultaneously create an observation chamber 88 between each pair of adjacent finger sections 58 to hasten the observation procedure.

The pressure to which interior region 94 is pressurized is preferably a pressure such that its magnitude expressed in inches of water is less than one half the height, in inches, of electrodes 54 and preferably less than one-third or even less than one-fourth of such height. This relationship results in the ability to leak-test a portion of each finger section at a time rather than the entire height of each finger portion since the pressure within region 94 will be insufficient to cause gas to escape through that portion of membrane 56 which is immersed to a depth, in inches, greater than the pressure, in inches, within region 94. For example, if region 94 is pressurized to seven inches of water, no indication will be given of leaks in that portion of membrane 56 which is more than seven inches below the surface of liquid 70 in tank chamber 60. Advantage can be taken of this principle by filling tank chamber 60 with liquid to a depth of, for example, seven inches, and then leak-testing membrane 56, then filling tank chamber 60 to a depth of 14 inches and checking the seven inch interval between the initial filling and the subsequent filling. This can be repeated until the full height of membrane 56 is leak-tested, thus isolating the leak to within a seven inch portion of a given finger section 58. The precise location of the leak can then be pinpointed by observing where the bubbles enter observation chamber 88.

While the above method has been described in terms of a preferred apparatus and method, it will be readily apparent to skilled artisans that other cell housing structures and other electrode configurations and orientations can be utilized as substitutes for the specific embodiments shown in the drawing. For example, a square cell body could be readily substituted for tubular cell body 38 and electrodes 54 could be supported from the side of the cell body rather than from the bottom as shown in FIG. 2. A garden hose could serve as liquid supply conduit 14 or adaptors could be provided to connect liquid supply conduit to one of inlet 28, outlet 36 or outlet 34. Restraint 64 could be replaced by any suitable structure adapted to prevent outward bending or bowing of electrodes 54 and could substitute braces placed against the interior surface of cell body 38 of connecting bolts 76. Regulator valve 98 and gauge 104 could be an integral part of a conventional compressor unit rather than separate parts as indicated in FIG. 6. Membrane 56 could be a semi-permeable or even slightly porous "diaphragm-type" material rather than an ion exchange membrane, however, a porous membrane would suffer from the disadvantage of allowing gas flow therethrough even though no leak existed and if sufficiently porous, would prevent location of small or minor leaks. Since such minor leaks would probably be of insignificant concern in the case of a porous membrane, the method of the invention would be useful for locating large leaks and faulty portions of such a porous membrane. The size of compressor 102 can be varied as necessary to maintain the desired predetermined pressure within region 94.

For large thickness cells or tall frameworks, a mirror (not shown) can be placed above the cell housing in order to simplify the observance of the separator. The mirror would be positioned and oriented so as to reflect an image of the separator, which reflected image would be observed. The mirror could be supported by an adjustable stand of sufficient height to allow use with various cell housing configurations and could be either of sufficient length to observe all portions of the separator or separators being tested or could be of smaller size and be movable so as to allow sequential viewing of portions of the separator or separators being tested.

Also, since a greater height of water above a leak in the separator than the height of the predetermined inflation pressure causes a flow of water into interior region 94, it is necessary that some system be provided for such inflow water either by way of preventing inflow or by means for ridding air supply conduit 16 of inflow water. A U-trap drain 120 could be added to conduit 16 to collect inflow water and a valved drain conduit 121 could be attached to the bottom of the U-trap to provide selective draining of liquid to a collection reservoir 122. Also, outlet 32 could serve as a reservoir for such liquid. Alternatively, the tank could be drained and membrane 56 removed upon detection of a leak and the leak repaired by any conventional method of repair or the membrane simply replaced. The repaired membrane or new membrane could then be sealingly reattached to the electrode backplate and the tank refilled in the manner above described. This draining, removal, repair, reattachment and refilling could be done for each leak as it was detected, thus substantially avoiding undesired water inflow.

It will be appreciated that the membrane 56 surrounds electrodes 54 and thus "negative" inflation pressure, or pressure within region 94 less than that due to depth of immersion at a given point on membrane 56 will result in membrane 56 being forced inwardly against electrodes 54. This inward force due to "negative" inflation pressure thus does not tend to stretch or tear membrane 56 or any seals in membrane 56 since electrodes 54 limit such inward movement and because the inward movement tends to contract or shrink membrane 56 rather than stretch or expand as is done by a positive inflation pressure.

It is to be further noted that the preferred membrane 56 is fabricated by heat sealing adjacent panels of membrane material and thus can withstand only limited differential pressures as any positive pressure in region 94 during lead-testing which is more than about 28 inches when expressed in height of water, may tend to rupture or split open the heat seals of membrane 56 at the top of the membrane as oriented in FIGS. 1 and 2 even though water pressure due to the presence of water in cell housing 12 might prevent rupture of heat seals at the lower end of the membrane. Thus the sequential filling of the cell housing 12 in discrete stages surprisingly avoids both flow of water into air conduit 16 and also rupture of heat seals of a heat sealed membrane.

Many other modifications will be readily apparent to ordinarily skilled artisans and the invention as defined in the following claims is intended to cover all such equivalent modifications and substitutes.

What is claimed is:

1. A method for leak-testing synthetic separators for interleaved planar electrodes, which comprises the steps of:
   (a) attaching a supportive cell housing to said electrodes;
   (b) installing said synthetic separator sealingly about said electrodes so as to create an enclosed chamber within said separator;
   (c) pressurizing said chamber to a predetermined pressure with a gas;
   (d) slowly filling said housing with a liquid to a level above said separator so as to slowly immerse said separator in said liquid; and
   (e) observing said separator while maintaining said predetermined pressure within said chamber so as to determine if excessive amounts of said gas indicative of a leak are escaping through any portion of said immersed separator.

2. The method of claim 1 which further comprises the step of laterally restraining said electrodes during said pressurization, so as to prevent outward bending thereof.

3. The method of claim 1 wherein:
   (a) said pressurization balloons adjacent planar portions of said separator together;
   (b) said method further comprises the step of forcing said planar portions away from each other to prevent blockage of said excess gas escape through any faulty portions of said separator while maintaining said predetermined pressure; and
   (c) said observing includes observing said forced-apart planar portions of said separator.

4. The method of claim 1 wherein said predetermined pressure is from about one inch to about 28 inches of water pressure above atmospheric pressure.

5. The method of claim 1, wherein:
   (a) said electrodes are cantilevered from a vertical side of said cell housing; and
   (b) said method further comprises the step of placing said housing with said vertical side down and said electrodes projecting upwardly therefrom.

6. The method of claim 5 which further comprises the step of supporting said vertical side upon a framework.

7. The method of claim 1 wherein:
   (a) said cell housing includes multiple gas and liquid inlets and outlets, at least one of said inlets and outlets communicating said enclosed chamber with the exterior of said cell housing; and
   (b) connecting a gas supply conduit to said at least one of said inlets and outlets and plugging all remaining gas and liquid inlets and outlets so as to enable said housing to be filled with said liquid.

8. The method of claim 7 wherein said predetermined pressure is from about one inch to about 28 inches of water pressure above atmospheric pressure.

9. A method for leak-testing synthetic separators for interleaved planar electrodes of an electrolytic cell, which comprises the steps of:
   (a) attaching a supportive cell housing to said electrodes;
   (b) installing said synthetic separator sealingly about said electrodes so as to create an enclosed chamber within said separator;
   (c) pressurizing said chamber to a predetermined pressure, said predetermined pressure being a gauge pressure which, when expressed in height of water, is at least one inch but no more than about half of the height of said separator, thereby only indicating leaks in that portion of the separator that is immersed in water to a depth in inches not greater than said height in inches of said predetermined pressure and thereby preventing indication in that portion of said separator therebelow;
   (d) slowly filling said housing in distinct stages with a liquid to a level above said separator so as to slowly immerse portions of said separator in said liquid; and
   (e) observing said separator while maintaining said predetermined pressure within said chamber so as to determine if excessive amounts of said gas indicative of a leak are escaping through any portion of said immersed separator.

10. The method of claim 9 wherein said predetermined pressure, when expressed in height of water, is no more than one-third the height of said separator.

11. The method of claim 10 wherein said predetermined pressure, when expressed in height of water, is no more than one-fourth the height of said separator.

12. The method of claim 1 wherein said observing step includes viewing a reflected image of said separator.

13. The method of claim 1 wherein said method includes the further step of inserting a spacer between adjacent sections of said separator to prevent said sections from contacting each other during pressurization of said separator and to facilitate said observing.

14. The method of claim 9 wherein said method includes the further step of repairing any leaks observed in the immersed portion of said separator prior to proceeding to fill said cell housing to the next of said stages.

15. The method of claim 9 further comprising the step of removing water entering said chamber during said leak-testing.

* * * * *